3,228,840
VIRUS CULTURE
Ian Alexander Macpherson, Bishopbriggs, Lanarkshire, and Michael George Parke Stoker, Glasgow, Scotland, assignors to National Research Development Corporation, London, England, a corporation of Great Britain
No Drawing. Filed Feb. 8, 1963, Ser. No. 257,078
Claims priority, application Great Britain, Feb. 9, 1962, 5,014/62
17 Claims. (Cl. 167—78)

This invention relates to virus culture, and is particularly concerned with the growth of viruses in the cells of a tissue culture. A deposit of a cell line culture identified as clone 13 of the BHK 21 hamster strain has been deposited on February 4, 1963, with American Type Culture Collection and assigned accession number CL 10.

The cultivation of viruses is of importance both for the production of vaccines and for medical and veterinary research. The presence of living cells is essential for proliferation, and viruses will normally multiply freely in the cells of a tissue culture. However, when large scale cultivation of viruses is undertaken, difficulties are frequently met in the supply of suitable living cell tissue in the quantities required. For instance the virus of foot and mouth disease is currently grown for vaccine production in cultures of pig kidney or calf kidney tissue. Since the living cells only survive a few generations the process is laborious and involves the repeated production of tissue cultures from fresh kidneys. This is undesirable because of variability between cultures from different animals, and the risk of undesirable bacterial and viral contaminants from the animals.

As an alternative to freshly prepared cell tissue in virus cultivation, attempts have been made to establish cell lines which can be cultivated and sub-cultivated and which can thus provide a standard source of cells suitable for the growth of viruses. A variety of cell lines have been established, but nevertheless no satisfactory culture system of this sort has emerged for the production of certain viruses, e.g. foot-and-mouth disease virus. The principal difficulty is that cells frequently change their character when cultivated for any length of time and become unsuitable for the growth of the virus.

A new cell line has now been discovered which can be cultivated and sub-cultivated for many months without showing any substantial change in character. Moreover, the cells of this new cell line multiply at a faster rate than is usual for living cells. It has also been discovered that the new cell line readily supports the growth of several viruses, and, as the cell line can be continuously cultured and recultured, and stored at sub-zero temperature when necessary, thus provides a ready source of supply of cells suitable for the growth of viruses.

The new cell line is a line of baby golden hamster kidney fibroblast cells, and has been designated BHK 21. The karyo-type of the cells appears to be the same as that found in primary cultures of hamster kidney. The cells are fibroblastic, and grow in a monolayer with a well marked tendency to parallel orientation. They have a high rate of growth, dividing approximately every twelve hours, and these characteristics have been maintained during culture for many months. This distinguishes them from other cell lines.

The new cell line was developed from a baby hamster kidney culture prepared as described by Stoker and Macpherson, Virology, 14, pages 359–370. Batches of cells were propagated by trypsinizing the monolayers of cells before they were completely confluent, and initiating a sub-culture with one tenth or one twentieth of the cell suspension. This necessitated sub-cultivation every 4th or 5th day. The culture medium used consisted of 10% unheated calf serum and 10% autoclaved tryptose phosphate broth in Eagle's basal medium modified to contain twice the normal concentration of amino acids and vitamins. With one exception, the batches of cells ceased to grow after a few transfers, the exception being the cell line BHK 21. This arose from cultures maintained in logarithmic growth for 30 days from the original suspension of kidney cells. The cells were then trypsinized, resuspended in medium containing 20% calf serum and 5% glycerol and cooled to $-70°$ C. After storing at this temperature for 6 days, the cells were recovered by thawing rapidly at $37°$ C. The cells were then cultured for a further 35 days, at which stage the cells were fast growing, had an average doubling rate of 12 hours and a plating efficiency of 2 to 10%. The cells subsequently did not change in character, and maintained their logarithmic growth rate.

It has also been found that cell line BHK 21 is transformed by polyoma virus. The transformed cells can be obtained from cell line BHK 21 by inoculation of the cells with polyoma virus. One week later, transformed cells could be identified among the normal cells and these were removed and purified by sub-cultivation.

The cell line BHK 21, and cells thereof which have been transformed by the action of polyoma virus, are grown in a nutrient medium. The culture system thus comprises the cells of this cell line in a suitable nutrient medium, which will usually contain amino acids, vitamins, carbohydrates and salts. In addition, antibiotics are conveniently added as a safeguard against the overgrowth of the culture with bacteria and fungi. It is convenient to supply these requirements by the use of Eagle's basal medium supplemented with 10% tryptose phosphate (Difco) and 10% calf serum.

According to the invention, therefore, there is provided a process of cultivating a virus which comprises inoculating with the virus a system comprising cells of the cell line BHK 21, or transformed cells thereof obtainable by the action of polyoma virus, and nutrients sufficient to maintain the cells viable for culturing the virus.

The cells can be cultured in any convenient way in air with 5% carbon dioxide e.g. by stationary or roller culture or stirred culture.

The nutrient medium used for the growth of some viruses can conveniently be the same as the medium hereinbefore described for the growth of the cell line. Other viruses, however, may require a modified nutrient medium for satisfactory growth.

The invention is of particular application to the cultivation of viruses of importance in human and veterinary medicine. Thus foot-and-mouth disease, trachoma and herpes viruses can be conveniently grown using the process of the invention, and the growth of Newcastle disease and fowl plague viruses, influenza and arthropod-borne viruses e.g. dengue virus has also been achieved. The successful growth of foot-and-mouth disease virus is especially important, and it has now been shown that large scale production of foot-and-mouth vaccine employing suspended culture techniques is feasible.

To determine whether BHK 21 cells are viable for a given virus is a relatively easy matter for the virologist. Employing the culture conditions, e.g. pH and temperature, normally used for the virus in other cell systems, viability in the new cell line is readily determined within a certain time after inoculation, which varies from virus to virus, by measuring the virus yield, and by observation of the cells for the characteristic cytopathic effect which is indicative of virus growth; the cells become rounded and granular and detach from the glass surface on which they have formed a monolayer.

The cells used for the purposes of the invention may be uncloned but are preferably cloned strains.

In order to produce corresponding vaccines from viruses cultivated by the present invention, it is necessary to further process the viruses by methods known per se.

The following examples illustrate the invention:

Example 1

BHK 21 cells in a culture medium, consisting of 10% unheated calf serum and 10% autoclaved tryptose phosphate broth in Eagle's basal medium modified to contain twice the normal concentration of amino acids and vitamins, were inoculated with a strain of the virus of foot-and-mouth disease which is designated strain 997 (C type) and which had been passaged 204 times in pig kidney cultures. The virus grew in the cell line, the virus titre being $10^{7.0}$.

Example 2

The process described in Example 1 was twice repeated using different strains of the virus of foot-and-mouth disease. The strains used were (1) strain RV 11 (type SAT 1, modified virus) which had been passaged 34 times in adult mice and twice in unweaned mice and (2) strain RV 11 (cattle virus) which had been passaged 25 times in cattle (stored filtrate). Both strains grew in the cell lines, and the virus titres were $10^{7.8}$ and $10^{6.5}$ respectively.

Example 3

When BHK 21 cells are inoculated with the HFEM virus of herpes simplex, and then incubated at 37° C. in the medium described in Example 1, the virus shows an increase of several orders of magnitude within a few days, causing simultaneous degeneration of the cells.

Example 4

BHK 21 cells suspended in a culture medium consisting of Hank's saline, lactalbumen hydrolyzate, human serum (10%) and calf serum (10%) are mixed with the T'ang (TESS) strain of trachoma virus also suspended in a similar medium and the mixture is gently shaken for half an hour at 37° C. The cells are separated from the suspension by centrifugation at 850 revolutions per minute for 10 minutes, and then resuspended in new medium, allowed to sediment on a cover slip and incubated for 24 hours at 370 C. The virus can then be seen to have grown.

Example 5

BHK 21 cells are grown as monolayers on petri dishes in the medium described in Example 1. When the growth of cells has become just confluent and before the cell culture is four days old, medium is washed off with a normal saline diluent which does not contain animal serum. Egg-adapted Newcastle disease virus is inoculated in small amounts on the washed monolayers of BHK 21 cells, thirty minutes allowed to elapse for adsorption of the virus, and the cells are then covered with nutrient medium. Incubation at temperatures between 35° C. and 38° C. results in increase of the virus, comparable to its natural increase in the chick embryo, and in destruction of the monolayer within two days. The effect is transmissible in BHK 21 cells.

Example 6

When the method described in Example 5 is used to grow fowl plague virus great increase of virus takes place and the monolayer of BHK 21 cells is destroyed. The effect is transmissible in BHK 21 cells.

Example 7

BHK 21 cells, grown as in Example 5, are inoculated with small doses of the neuropathogenic (NWS) strain of influenza A virus. Destruction of the cell layer follows and fully infectious NWS virus is produced. The effect is transmissible in preparations of BHK 21 cells.

Example 8

The method of Example 5 is followed, but the BHK 21 cells are infected with a non-neuropathogenic strain of influenza virus A in large amounts, say 10 to 100 particles per cell. After 18 hours' incubation at 37° C., large amounts of non-infectious virus haemagglutinin and virus soluble antigen are formed which are useful for experimental immunization and for serological tests. The BHK 21 cells are destroyed, but effect cannot be transmitted from one preparation of BHK 21 cells to another.

Example 9

A cloned strain of BHK 21 cells (clone No. 13) which had had 110 monolayer transfers was suspended in 200 mls. of culture medium consisting of Eagle's basal medium modified to contain twice the normal concentration of amino-acids and vitamins with 10% Seitz-filtered bovine serum and 10% tryptose phosphate broth and containing penicillin (100 units/ml.), streptomycin (100 units/ml.), mycostatin (25 units/ml.) and neomycin (70 units/ml.). The suspension was introduced into a cylindrical Pyrex glass vessel of diameter 7.6 cms. and height 25.4 cms. and having two glass entry ports at the top end.

A number of such unit systems was prepared each vessel being stirred by central Teflon coated bar magnets rotated at 335 r.p.m. by mechanically propelled external magnets. The vessels were held in a 37° C. water bath. They were sealed with glass stoppers after seeding and no aeration was attempted.

To avoid clumping of the cells and growth on the sides of the vessels the cells were collected every 24 hours, resuspended in Versene-trypsin (0.01%) mixture for one hour, and then introduced into fresh medium. After an initial period regular growth occurred and a cell yield of $2$–$3.6 \times 10^{8.0}$ cells per 48 hours was achieved.

Further propagation may be carried out in 5 litre vessels fitted with pH monitoring and aeration equipment. Aeration with air/$CO_2$ mixture sufficient to maintain pH at 7.0–7.2 has been found suitable. With careful selection of culture conditions, the growth of foot and mouth and other viruses in suspended cell culture is also possible.

Example 10

A 4-day old monolayer culture of BHK 21 cells (clone 13) in a Roux bottle, i.e. about $10^8$ cells, was inoculated with 1.0 ml. of a type SAT 2 foot-and-mouth disease virus suspension having a titre of $10^{7.0}$ mouse $ID_{50}$/ml. Following adsorption of virus for one hour at 37° C. the culture was washed five times with phosphate-buffered saline and then 80 ml. of modified Eagle's medium plus 10% tryptose phosphate broth was added. After incubation for 22 hours the fluid was collected and cell debris removed by centrifugation. To the supernatant an equal volume of glycerol was added and the vaccine preparation stored at $-20°$ C.

Innocuity and immunogenicity tests on the vaccine in cattle show comparable results with those obtained with mouse tissue vaccine.

BHK 21 cells have been deposited in Great Britain with the Medical Research Council's Division of Immunological Products Control, Hampstead, London, and are also available at the Wistar Institute, Philadelphia, U.S.A.

We claim:

1. A cell culture system comprising cells of the baby golden hamster kidney fibroblast cell line designated BHK 21 in a nutrient culture medium therefor.

2. A cell culture system according to claim 1, in which the nutrient medium is Eagle's basal medium modified to have an enhanced proportion of amino acids and vitamins and containing in addition tryptose phosphate broth and unheated bovine serum.

3. A process for the preparation of a veterinary vaccine which comprises maintaining a viable culture of cells of the baby golden hamster kidney fibroblast cell line designated BHK 21 in a nutrient culture medium, inoculating said culture with a veterinary virus to which said cells are susceptible, cultivating said virus in said culture, and recovering a harvest of virus therefrom.

4. A process for the cultivation of foot-and-mouth disease virus in tissue culture which comprises inoculating cells derived from the baby golden hamster kidney fibroblast cell line designated BHK 21 with said virus, in a nutrient culture medium.

5. A process according to claim 4 in which the strain of cell used is a cloned strain.

6. A process according to claim 4, in which the virus is cultivated in suspended culture.

7. A process according to claim 6 in which the strain of cell is a cloned strain.

8. A process for the cultivation of Newcastle disease virus in tissue culture which comprises inoculating cells derived from the baby golden hamster kidney fibroblast cell line designated BHK 21 with said virus, in a nutrient culture medium.

9. A process according to claim 8 in which the strain of cell is a cloned strain.

10. A process for the cultivation of fowl plague virus in tissue culture which comprises inoculating cells derived from the baby golden hamster kidney fibroblast cell line designated BHK 21 with said virus, in a nutrient culture medium.

11. A process according to claim 10 in which the strain of cell is a cloned strain.

12. A process for the cultivation of herpes simplex in tissue culture which comprises inoculating cells derived from the baby golden hamster kidney fibroblast cell line designated BHK 21 with said virus, in a nutrient culture medium.

13. A process according to claim 12 in which the strain of cell is a cloned strain.

14. A process for the cultivation of trachoma virus in tissue culture which comprises inoculating cells derived from the baby golden hamster kidney fibroblast cell line designated BHK 21 with said virus, in a nutrient culture medium.

15. A process according to claim 14 in which the strain of cell is a cloned strain.

16. A process for the cultivation of influenza in tissue culture which comprises inoculating cells derived from the baby golden hamster kidney fibroblast cell line designated BHK 21 with said virus, in a nutrient culture medium.

17. A process according to claim 16 in which the strain of cell is a cloned strain.

References Cited by the Examiner

UNITED STATES PATENTS 3,058,883 10/1962 Varnet -------------- 167—53

OTHER REFERENCES

Sachs: Nature, vol. 189, No. 4763, Feb. 11, 1961, pp. 457–458.

Stoker: Virology, vol. 14, p. 360, July 1961.

LEWIS GOTTS, *Primary Examiner.*

FRANK CACCIAPAGLIA, Jr., *Examiner.*